United States Patent
Naganathan et al.

(10) Patent No.: US 7,363,211 B1
(45) Date of Patent: Apr. 22, 2008

(54) METHOD AND APPARATUS FOR MODELING TOPOLOGY OBJECTS

(75) Inventors: Narayani Naganathan, Sunnyvale, CA (US); Peinan Zhang, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 463 days.

(21) Appl. No.: 10/792,668

(22) Filed: Mar. 3, 2004
(Under 37 CFR 1.47)

(51) Int. Cl.
*G06F 7/00* (2006.01)
*G06F 9/455* (2006.01)

(52) U.S. Cl. .............................. 703/22; 703/2; 707/100
(58) Field of Classification Search .............. 703/2, 703/22, 1; 709/201, 220, 223; 370/395; 707/100
See application file for complete search history.

(56) References Cited

U.S. PATENT DOCUMENTS

| | | | |
|---|---|---|---|
| 5,848,243 A * | 12/1998 | Kulkarni et al. | ............. 709/224 |
| 5,948,055 A * | 9/1999 | Pulsipher et al. | ............. 709/202 |
| 6,016,153 A * | 1/2000 | Gueziec et al. | ............. 345/441 |
| 6,243,746 B1 * | 6/2001 | Sondur et al. | ............. 709/220 |
| 6,457,048 B2 * | 9/2002 | Sondur et al. | ............. 709/220 |
| 7,111,016 B2 * | 9/2006 | Gurevich | ................ 707/103 R |
| 2001/0032256 A1 * | 10/2001 | Sondur et al. | ............. 709/223 |
| 2004/0193388 A1 * | 9/2004 | Outhred et al. | ................ 703/1 |
| 2004/0199572 A1 * | 10/2004 | Hunt et al. | ................ 709/201 |
| 2004/0205179 A1 * | 10/2004 | Hunt et al. | ................ 709/223 |
| 2004/0267778 A1 * | 12/2004 | Rudolph et al. | ............. 707/100 |
| 2006/0031439 A1 * | 2/2006 | Saffre | ......................... 709/223 |

\* cited by examiner

*Primary Examiner*—Thai Phan
(74) *Attorney, Agent, or Firm*—Osha Liang LLP

(57) ABSTRACT

The invention relates to a method for modeling a device in a topology including defining a managed object corresponding to the device, defining a managed resource using the managed object, and creating a node in the topology, wherein creating the node comprises associating the node with the managed resource.

46 Claims, 5 Drawing Sheets

METHOD AND APPARATUS FOR MODELING TOPOLOGY OBJECTS

BACKGROUND

Organizations face a difficult challenge in managing the availability of applications and computing resources within an enterprise system. The growth of networks and distributed systems has led to an increasingly complex heterogeneous enterprise environment, encompassing a broad spectrum of hardware, software, and operating systems. Today, systems range from personal computer and technical workstations on users' desktops, to small and mid-sized servers in corporate departments, all the way up to large enterprise servers and mainframes in corporate data centers. Computing resources may be geographically dispersed across a business campus or around the world to support global business operations. The proliferation of local area networks (LANs) and wide area networks (WANs) allows users to access corporate information assets almost anywhere, any time of day or night. (See, *The Architecture of Sun™ Management Center*, Sun Microsystems, 2000). (Sun is a trademark of Sun Microsystems, California, U.S.A).

The use of mission-critical applications has increased with the increase in distributed corporate computing. In turn, companies have become more competitive and conduct business more effectively. The mission-critical nature of these applications, however, is intensifying an already difficult system management task. Users are demanding systems and applications that are continuously accessible and available—with expectations for improved levels of service that are constantly on the rise.

In response, resource management applications have been developed to aid in the management of networked systems. The resource management applications are typically interfaced with the physical resources within the network and provide a console client (e.g., a user-interface) from which an administrator may administer the network system (or individual resources within the system).

Resource management applications typically includes a topology service that provides functionality to model, organize, and display the network system. Most topology services are tailored to a specific resource that the resource management application is designed to manage. The topology service defines the various features of the topology service, including how to discover the various resources within the network, how to model the resources, how to represent the resources to the administrator, etc. When the underlying resource is changed, the topology service typically needs to be modified to accommodate the change. In addition, different resource management applications using tailored topology services are typically required for different types of resources. Thus, within an enterprise system, a resource management application used to manage network hardware may be different than the resource management application used to manage software applications running on the network hardware.

SUMMARY

In general, in one aspect, the invention relates to a method for modeling a device in a topology, comprising defining a managed object corresponding to the device, defining a managed resource using the managed object, and creating a node in the topology, wherein creating the node comprises associating the node with the managed resource.

In general, in one aspect, the invention relates to a topology modeling framework, comprising a managed objected corresponding to the device, a managed resource associated with the managed object, and a topology comprising at least one node, wherein the node is associated with the managed resource.

In general, in one aspect, the invention relates to an enterprise system for modeling a topology having a plurality of node, comprising a device tier including at least one device, a presentation tier including at least one client console, and a service tier interfacing the device tier and the presentation tier using a resource management system, wherein the resource management system comprises a topology service using a topology modeling framework comprising a managed object corresponding to the at least one device, a managed resource associated with the managed object, and a topology executing on the topology service comprising at least one node, wherein the node is associated with the managed resource.

Other aspects of the invention will be apparent from the following description and the appended claims.

DETAILED DESCRIPTION

Figure 1:
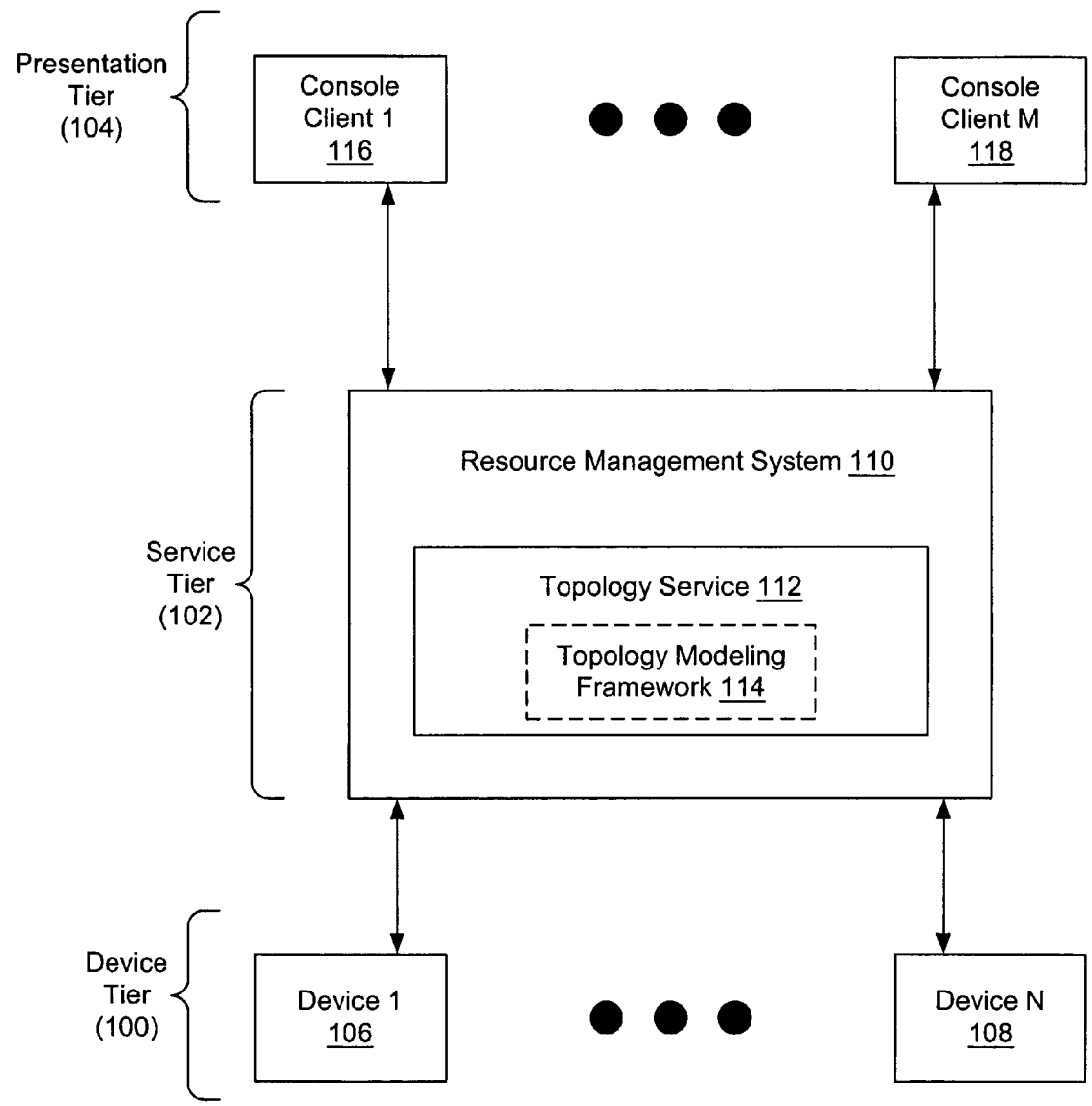
FIG. 1 shows a flow diagram in accordance with one embodiment of the invention.

Exemplary embodiments of the invention will be described with reference to the accompanying drawings. Like items in the drawings are shown with the same reference numbers. Further, the use of "ST" in the drawings is equivalent to the use of "Step" in the detailed description below.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a topology modeling framework. More specifically, embodiments of the invention provide a generic topology modeling framework that may be used to model topology objects. In various embodiments of the invention, the topology objects may represent logical and/or physical devices independent of the network system or architecture upon which they are implemented. Further, the topology modeling framework may model a given topology without being constrained to modeling only a particular type of logical and/or physical device or set of devices.

FIG. 1 shows a flow-diagram of a three-tiered system upon which the invention may be implemented in accordance with one embodiment of the invention. The three tiers of the system include: 1) a device tier (100); 2) a service tier (102); and 3) a presentation tier (104). The device tier (100) may include one or more physical or logical devices (106, 108). Those skilled in the art will appreciate that the logical device may correspond to entities, which are not physically connected to network. For example, in one embodiment of the invention, a resource management system (110) may be used to manage a sales team by creating a logical device associated with each individual on the sales team and then monitoring the sales revenue generated by each individual on the sales team compared to the amount of expenses generated by each individual.

Continuing with the discussion of FIG. 1, the devices (106, 108) contained in the physical device tier (100) are operatively connected to the service tier (102), which includes a resource management system (110). The resource management system (100) includes a topology service (112), which has functionality to create and manipulate a topology. Alternatively, the topology service (112) is one of a plurality of services included within the resource management system (110).

Figure 2:
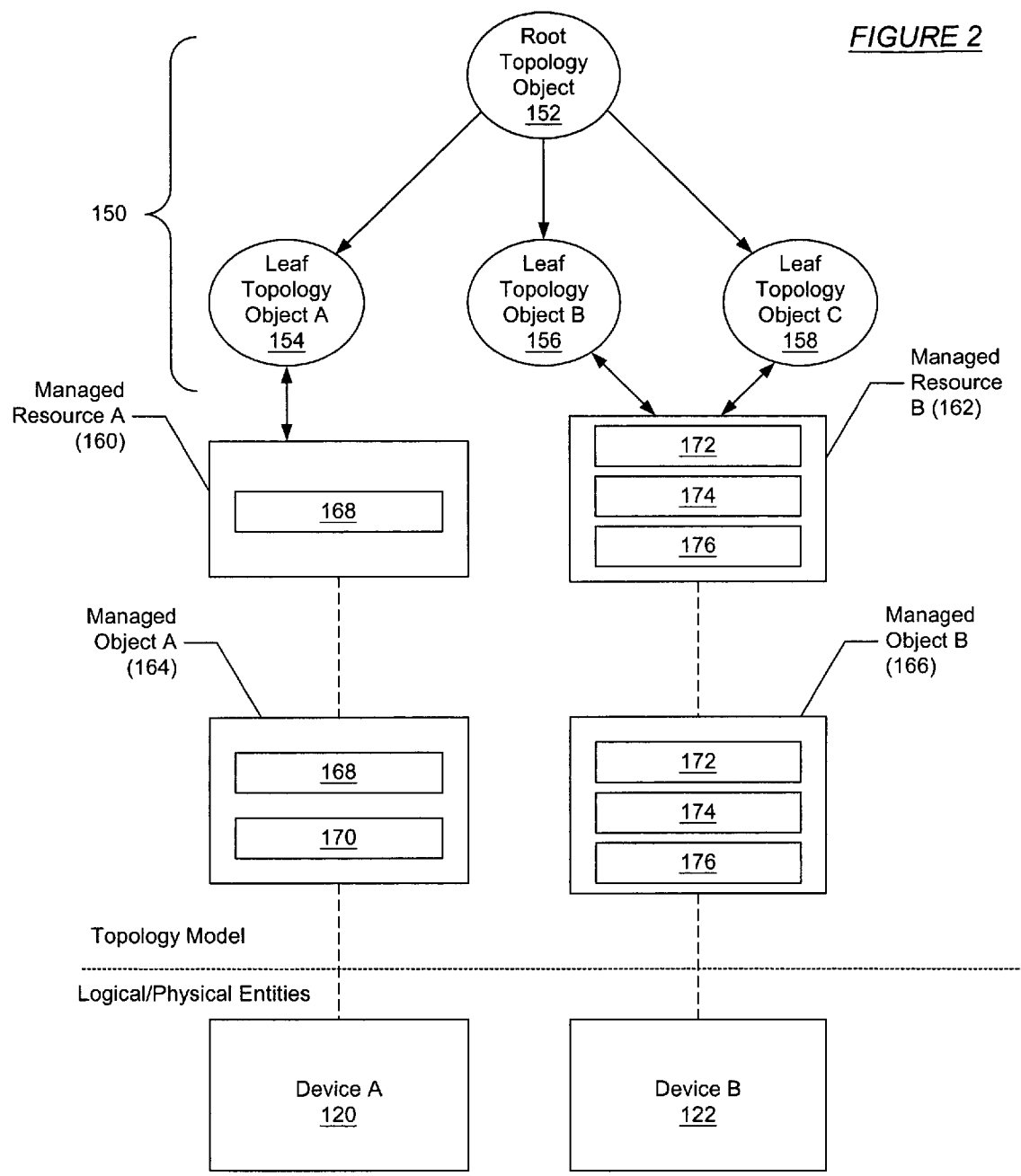
FIG. 2 shows a flow diagram in accordance with one embodiment of the invention.
Figure 3:
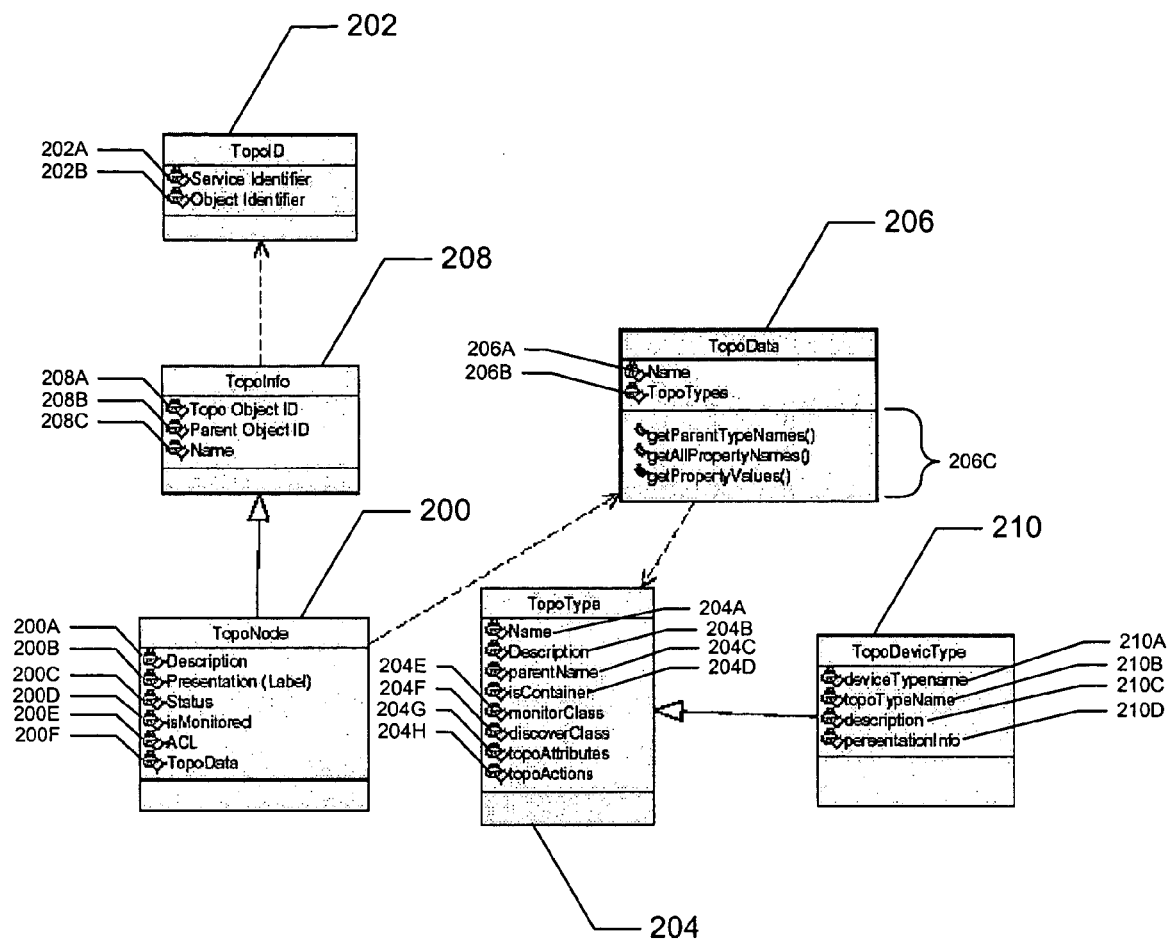
FIG. 3 shows a class diagram in accordance with one embodiment of the invention.

The aforementioned functionality, in one embodiment of the invention, is governed by a topology modeling framework (114) which defines the infrastructure necessary to model topology objects and provide the aforementioned functionality. FIGS. 2 and 3 provide examples of the topology modeling framework (114) and are discussed in detail below. Similarly, a service framework (not shown) defines the infrastructure for the resource management system (110), and more specifically how various services interact with the resource management system (110).

In one embodiment of the invention, a topology within the topology modeling framework (114) is a set of nodes linked in tree structure. Every tree structure has a root node, branch nodes, and leaf nodes. Branch nodes and root nodes are containers for other nodes. Further, each node may be associated with a logical or physical device. The topology may also include more than one tree. An example of a topology is shown in FIG. 2 and described in detail below. Further, in one embodiment of the invention, the topology service (112) is one of many services provided in the service tier (102) shown in FIG. 1.

In one embodiment of the invention, the resource management system (110) as shown in FIG. 1 includes functionality for plugging in new services (e.g., the topology service (112)), and interacting with existing services (not shown). Further, the resource management system (110) includes functionality for performing service registration, service lookup, service configuration, and service instantiation. The resource management system (110) may also include functionality for providing a set of utilities to create and manage object persistence, security, etc.

Continuing with the discussion of FIG. 1, the presentation layer (104) is operatively connected to the resource management system (110) within the service layer (102). The presentation layer may include one or more console clients (116, 118). In one or more embodiments of the invention, the console clients (116, 118) provide platform independent, network access to system management information present in the service layer (102). In one embodiment of the invention, the resource management system (110) includes functionality allowing the console clients (116, 118) the ability to manipulate the topology via the topology service (112) (or a related service).

FIG. 2 shows a flow diagram of the relationship between various components in the topology with the various components that exist outside the topology. As noted above, a topology (150) includes one or more nodes (152, 154, 156, 158). Each node (152, 154, 156, 158) within the topology (150) may be classified as a root topology object (e.g., 152), a branch topology object (not shown), or a leaf topology object (e.g., 154, 156, 158).

As noted above, each topology object represents a node in topology. Each topology object typically includes hierarchical relationship information, i.e., which topology leaf object belongs to which topology branch, etc., required to build a particular tree structure within the topology. The topology object may also be associated with a managed resource (i.e., 160, 162). A managed resource is described in detail below. In addition, each topology object may contain naming information, presentation information, security information, information about the associated managed resource, information about the highest severity alarm of the topology object (i.e., is the topology object operating normally or is the topology operating in another state, for example, partially down, completely down, etc.), etc.

As noted above, a topology object may be associated with a managed resource (160, 162). Further, one or more topology objects may be associated with a given managed resource (160, 162). In one embodiment of the invention, the managed resource (160, 162) represents the minimum characteristics of a managed object (164, 166) required to represent the managed object (164, 166) adequately in topology (100), where the managed object represents a logical or physical device (120, 122) that the user wishes to manage. Accordingly, in the particular embodiment shown in FIG. 2, managed object 1 (164) includes two characteristics (168, 170) with only one of the two characteristics (168) being required by the managed resource (160) to adequately represent the managed object (164) in the topology (100). However, managed object 2 (166) includes three characteristics (172, 174, 176) with all three characteristics (172, 174, 176) being required by the managed resource (162) to adequately define the managed object (166) within the topology (100).

The following example illustrates the relationship between a device, a managed objected, and a managed resource. Consider the situation where a network includes a host computer having the following characteristics that the user wishes to associated with a topology object: an Internet Protocol (IP) address, a Simple Network Management Protocol (SNMP) Port, three processors, and two hard disks. Initially, a managed object is created that includes all of the aforementioned characteristics. Next, a managed resource is created that includes only the IP address and the SNMP port. Those are the only two characteristics chosen because they are required to adequately represent the host computer in the topology.

The managed resource may then be associated with a topology object. Note that the characteristics required to adequately represent the managed object in the topology may be dependent on how the user wishes to represent the managed object in the topology. Accordingly, different managed resources may be generated from the same managed object for two different representations of the managed object in the same or different trees within a topology or in different topologies.

In one embodiment of the invention, each topology object (regardless of the manner in which it is characterized) may be defined as a series of related components. In an object oriented language, each topology object may also be defined by a series of classes. Those skilled in the art will appreciate that while an embodiment of the invention is described using an object oriented language, the invention may be implemented using a non-object oriented language.

FIG. 3 shows a class diagram in accordance with one embodiment of the invention. As noted above, a topology object is represented as a node in a topology tree. A TopoNode class (200) is used to specify the node within the topology tree. In addition, the topology object, represented by the node, may be uniquely defined across the topology using a unique identification. The unique identification is provided by the TopoObjectID class (208A). A topology object specified using the TopoNode class (200) may include one or more of the following components: 1) a TopoObjectID object (208A); 2) a parent TopoObjectID (208B); 3) a name component (208C); 4) a Description component (200A); 5) presentation component (200B); 6) a Status Message component (200C); 7) an is Monitored component (200D); 8) an access control list ("ACL") component (200E); and 9) a TopoData object (200F).

The TopoObjectID (208A) uniquely identifies a topology object in the topology. The TopoID class (202) defining the TopoObjectID (208A) is described below. The parent TopoObjectID (208B) uniquely identifies the parent of the topology object in the topology. The parent TopoObjectID (208B) is also defined by the TopoID class (202) described below. The name component (208C), typically of string type, includes the name of the topology object. The TopoID object (208A), the parent TopoObjectID (208B), and the name component (208C) are typically included within a TopoInfo object associated with the topology object. The TopoInfo class (208) defining the TopoInfo object is described below.

Returning to the discussion of the TopoNode class (200), the description component (208A), typically of string type, includes the description of the topology object. The presentation component (208B), typically of string type, corresponds to the i18n key for the label to be shown via a user interface to the user.

The status message component (200C), typically of string type, provides the highest alarm level (i.e., the most critical alarm level) most recently encountered by the topology object. The is Monitored component (200D), typically of Boolean type, indicates if this topology object is monitored for alarm status.

Continuing with the discussion of the topology object, the TopoData object (200F) represents a managed resource associated with the topology object. The TopoData object is defined by the TopoData class (200F) described below.

The ACL component (200E) includes the access control list for the topology object. In embodiment of the invention, the ACL component (200E) is an object. Further, in one embodiment of the invention, the object is defined by the service framework (described above). Alternatively, the ACL component (200E) is defined by the topology modeling framework. In one embodiment of the invention, the topology service provides two ACLs: one for the method level and one for the in the object level. The method level ACL, is defined during the system setup time and, typically, cannot be changed. The method level ACL may define, for example, which groups of users can perform the operation: "create topology node" in a particular topology. In contrast, the object level ACL is specified after the object is created and may be changed after it is initially created. The object level ACL may include, for example, access permission to allow certain groups or users to view or modify a given object. Those skilled in the art will appreciate that while the invention has been described with respect to using the ACL component, the ACL component may be substituted or augmented with any type of compatible security mechanism.

As noted above, the TopoNode object defined by the TopoNode class (200) includes a TopoID object, which is defined by the TopoID class (202). The TopoID class (202) provides a means for uniquely identify the topology object. In one embodiment of the invention, TopoID object, defined by the TopoID class (202) uniquely identifies the topology object by defining a ServiceID (202A) and an TopoObjectID (202B). In one embodiment of the invention, the ServiceID (202A) is defined by the service Framework and uniquely identifies the topology service within the resource management system. Alternatively, the ServiceID (202A) may be defined using a lookup service. For example, lookup service may provide the <service name> and <server host> information which may be used to generate the ServiceID (202A). The ServiceID (202A) typically contains the hostname and lookup port of the host on which the Topology service is running. The TopoObjectID (202B) uniquely identifies the topology object within the topology. For example, the TopoObjectID (202B), in one embodiment of the invention, may correspond to an index in a certain database table or a persistent storage. In one embodiment of the invention, the TopoID object is generated by the topology service when a topology object is created.

The individual components of the TopoID object associated with a given topology object are typically not available to the user. Rather, the user must use the TopoID object as a whole when referring to a topology object within the topology. In one embodiment of the invention, an Application Programming Interface (API) is provided to obtain a string representation of the TopoID object.

As noted above, the TopoID object, defined above, is used in a TopoInfo class (208). The TopoInfo object, defined by the TopoInfo class (208), represents the minimum information required to represent a topology node in the presentation tier. In this manner, the topology modeling framework minimizes the amount of data transferred back and forth between the service tier and the presentation tier. Further, the information in TopoInfo object is sufficient to allow a user to query entire topology to obtain a particular topology node.

The TopoInfo object, as defined by the TopoInfo class (208), may include on or more of the following components: 1) a TopoObjectID (208A); 2) a parent TopoObjectID (208B); and 3) a name component (208C). The TopoObjectID (208A), typically defined by the TopoID class (202) (described above), represents the topology TopoObjectID. The parent TopoObjectID (208B), typically defined by the TopoID class (202), represents the topology TopoObjectID of the parent of this topology object. The name component (208C), typically of string type, corresponds to the name of the TopoInfo object (typically the same as the corresponding TopoNode object name component). Note that the minimum information required to represent a given topology object in the presentation tier, as defined above, is subject to change based on the requirements of the presentation tier.

As noted above, a topology object may be associated with a managed object. In one embodiment of the invention, a TopoData class (206) defines a TopoData object, which represents a managed resource. As noted, while a given managed object may include numerous components/characteristics, the managed resource is only required to include the necessary components/characteristics required to represent the managed object in the topology. The remaining characteristics associated with the managed object may be maintained in a separate data structure.

The TopoData object, as defined by the TopoData class (206) may include one or more of the following components 1) a topology type component (206B); 2) a list of properties component (not shown); and 3) a name component (206A). The topology type component (206B) typically includes the name of the current topology type (derived from a TopoType object described below) for this managed resource. In addition, the topology type component (206B) may also include a list of all topology types derived from the current topology type of the managed resource.

The list of properties component (not shown) typically includes a list of name-value pairs of the properties of the managed resource. The list of properties component also includes the properties of the current TopoType (described below) and the properties of the TopoType that extend the current TopoType. In one embodiment of the invention, the list of properties component is implemented as a hash table of hash tables, where the properties of each TopoType (i.e., the current TopoType and all TopoTypes that extend the current TopoType) are grouped in to individual hash tables indexed by TopoType. In addition, the TopoData class may define methods (206C) to obtain ParentType names, property names, and corresponding property values.

In one embodiment of the invention, two levels of topology modeling are implemented. The first level of topology modeling is type modeling, defined by the TopoType class (204) and is contained within the TopoData object (as described above). In general, the TopoType class (204) generates a TopoType object, which models the characteristics of the topology object. More specifically, the TopoType class (204) provides a mechanism by which a user can model the information required to create/discover and represent a topology object adequately in the topology. For example, a SNMP agent type may be defined, using the TopoType class (204), to include an IP address and a SNMP port, and a ping host may be defined to include an IP address.

The second level of modeling is device type modeling, defined by the TopoDeviceType class (210) and is contained within the TopoType object (as defined below). In general, device type modeling provides the representational characteristics (i.e., icons) of a topology type (e.g., SNMP agent, ping agent, a web server, etc.), which represents a logical or physical device within the topology. Thus, in keeping with above example, a mainframe may be modeled as a mainframe device, by TopoDeviceType, and further modeled as an SNMP agent in the topology, using TopoType. Thus, the mainframe may initially be presented using a mainframe icon plus an SNMP icon. If the mainframe is subsequently modeled as a web server, then the mainframe may be presented using a mainframe icon with a web server icon (defined using TopoType).

In one embodiment of the invention, topology type modeling may be performed using the following information: naming information, presentation information (e.g., container, icon, internationalization information, etc.), parenting information (e.g., parent type), monitoring information (e.g., information regarding whether the object is monitorable, how to monitor the object, etc.), discovery information (e.g., the discovery method), actions information (e.g., what actions can be applied on a object having this type, etc.), and attributes. The topology type class (204) described below, illustrates an implementation of the topology type modeling.

The components in the TopoType class (204) and the TopoDeviceType class (210) are now described in detail below. The TopoType object, defined by the TopoType class (204), may include one or more of the following components: 1) a topology type name (204A); 2) a description component (204B); 3) a presentation component (not shown); 4) an is Container component (204D); 5) a parent type component (204C); 6) a monitor class component (204E); 7) a discovery class component (204F); 8) a TopoAttribute component (204G); and 9) a TopoAction component (204H).

The topology type name (204A) corresponds to the name of the topology type (e.g., SNMP agent, ping host, etc.). The description component (204B), typically of string type, corresponds to the description of the TopoType object. The presentation component (not shown) may include a small icon component, a large icon component, an internationalization label, etc. The small icon component may include the path to the small icon, which represents this TopoType. If it is not provided, a default icon may be provided. Similarly, the large icon component may include the path to the large icon, which is used to represent the TopoType. If it is not provided, a default icon may be provided. The is Container component (204D), typically of Boolean type, indicates if the TopoType is a container object. A value of true indicates that the topology object associated with this topology type is a container object (i.e., the topology object is a branch in a topology). In one embodiment of the invention, the is Container component defaults to false.

The parent type name component (204C) defines a parent object for the TopoType. This component is typically included to enable extension of topology types. If this component is omitted, the TopoType may default the parent type name component to a base type. The discovery class component (204F) includes a path to a class that includes functionality to discovery this TopoType. Alternatively, the discovery class component may be a function or script that may be invoked to perform discovery operations. Typically, the user who defines a new TopoType object is required to provide the path. If the path is not provided, then the new TopoType object cannot be discovered.

The monitor class component (204E) includes a path to a class that includes functionality to monitor for this TopoType object. Typically, the user who defines a new TopoType object typically provides the path. If the path is not provided, then the new TopoType is not monitored for change in state. Alternatively, the monitor class (204E) component may be a function or script that may be invoked to perform monitoring operations. In one embodiment of the invention, the topology service obtains the highest severity alarm using the path specified in the monitor class component. If the information on how to obtain the highest severity alarm for the TopoType is not provided, then by default the topology object, with which the TopoType is associated with, is not monitored for its highest severity alarms. Thus, if it is not monitored for its highest severity alarms and if the topology object represents a leaf node in the topology (i.e., it is not a container), then no alarm status is returned for the topology object. In one embodiment of the invention, by default all topology objects that are container objects (as defined by the is Container component described above) are not monitored for alarm status and the alarm status returned for them is the highest severity of alarms of all the associated child nodes.

TopoAttribute component (204G) represents the properties associated with the TopoType object. There may be zero or more properties in the TopoAttribute component. The TopoAttribute component (204G) may be implemented as an array, where each element in the array is a TopoAttribute object (described below). The TopoAction component (204H) represents actions that are possible on this topology type (e.g., menu commands, etc.). There may be zero or more actions defined in the TopoAction component. The TopoAction component may be implemented as an array, where each element in the array is a TopoAction object (described below).

In one embodiment of the invention, the TopoType object may be modeled by obtaining user input for certain mandatory component and obtaining user input for some or all optional components. For example, the topology type name (204A) is mandatory, while the remaining components are optional. However, some of the optional components may default to a certain value. For example, the is Container component (204D) may default to false (i.e., not a container) and the parent type name component may default to a base type.

The input may be obtained from the user using a script based interface (described below) or a graphical interface. The information obtained from the user may be stored in an Extended Mark-up Language (XML) file that may then be used by the topology service to model a topology object.

As noted above, a TopoType may be associated with one or more TopoDeviceTypes. The TopoDeviceType class (210) defines a TopoDeviceType object which may include one or more of the following components: 1) a device type name (210A); 2) a description component (210C); 3) a presentation component (210D); and 4) a TopoType name component (210B).

The device type name (210A) corresponds to the name of the device type (e.g., a SPARC workstation). The description component, typically of string type, corresponds to the description of the TopoDeviceType object. The presentation component (210D) may include a small icon component which may include the path to the small icon, which represents this TopoDeviceType. If it is not provided, a default icon may be provided. In addition, the presentation component (210D) may also include a large icon component (not shown) which includes the path to a large icon, which is used to represent the TopoDeviceType. If it is not provided, a default icon may be provided. The topology type name component (210B), typically of string type, includes the name of the TopoType object for which the aforementioned icons (i.e., small icon and large icon) should be used.

Once a TopoType object has been created, a TopoDeviceType object may then be associated with the TopoType (204). In one embodiment of the invention, the TopoDeviceType object may be modeled by obtaining user input for certain mandatory components and obtaining user input for some or all optional components. For example, the device type name (210A), a presentation component (210D) and the topology type name component (210B) are mandatory, while the remaining components are optional. Similar to TopoType modeling, device type modeling may be performed using a script based interface (described below) or a graphical interface. The information obtained from the user may be stored in an Extended Mark-up Language (XML) file that may then be used by the topology service to model a topology object.

As noted above, the TopoType object may include a TopoAttribute component. In one embodiment, the TopoAttribute component may include one or more TopoAttribute objects, defined by a TopoAttribute class. For example, if a topology object is of type SNMP Agent, then the TopoType object associated with the topology object may include the following properties: an IP address representing the IP address of the host where the SNMP agent resides, the Port representing the port where the SNMP agent is running, the device type representing the type of device (defined using TopoDeviceType), etc.

In one embodiment of the invention, each TopoAttribute object may include one or more of the following components: 1) a name; 2) a description component; 3) a type component; 4) a value component; 5) an is Key component; and 6) a user specified component.

The name corresponds to the name of the attribute. The description component includes a description of the attribute. The type component defines to the data type of the value component, e.g., integer, float point, string, char, etc. The value component includes to the value of the attribute. The type of the value is dictated by the type component. The is Key component, typically of Boolean type, indicates whether this attribute is a key component to uniquely identify a managed resource. In one embodiment of the invention, one or more attributes may be key components which are used in combination to uniquely identify a managed resource, A value of true indicates that the attribute is a key attribute. Additional details regarding the key are described below. The user specified component, typically of Boolean type, indicates if this attribute needs to be input by the user at the time of creating or discovering a topology object. A value of true indicates it has to be specified by the user.

In one or more embodiments of the invention, there is only one instance of each managed resource (represented as a TopoData object) in a given topology. In order to prevent duplication, the user or the topology service (or a related service) specifies an attribute, which may be used to uniquely identify the managed resource in the topology. For example, if the managed resource is an system user, then a userID attribute may be used to uniquely identify the system user. The attribute that is used to uniquely identify the managed resource may be defined when the topology type is defined. The particular attribute that is used to uniquely identify the managed resource may then be flagged, for example, using the is Key component in the TopoAttribute object.

As noted above, in one embodiment of the invention, the TopoType object may include a TopoAction component. The TopoAction component represents actions that are possible on a topology object via a user interface. For example, the TopoAction may present the following menu commands to a user when an user object (a representation of the topology object in the presentation layer) is selected from a topology viewer and the mouse is right clicked: Cut, Copy, Show User Details.

The TopoAction object may include one or more of the following components: 1) name; 2) a descriptive component; and 3) a function component. The name component corresponds to the name of the TopoAction. The description component may include a description of the action. The function component typically corresponds to an operation that the action can invoke. For example, the function component may include a script to trigger the operation or a path to a piece of code (e.g., a class in object oriented language), which performs the action.

Those skilled in the art will appreciate that the aforementioned classes and corresponding objects may be derived from a base object defined by the service framework.

The following is an example of a script based interface for topology type modeling in accordance with one embodiment of the invention. The following example is not intended to limit the scope of the application. Note that the user response/input is delimited by "{ }."

Example of Script based Interface for Topology Type Modeling

---

Choose from the following options:
1 to list existing topology types or n to enter new topology type or q to quit: {n}
Enter the following information:
Topology Type Name: {Employee}
Topology Description: {Employee type}
Do you want to model a container? Choose 'y' for yes and 'n' for no: {n}
Icon: {/tmp/employee-icon.gif}
Do you want this topology type to extend an existing topology type? Choose 'y' for yes and 'n' for no: {n}
Monitor Class: {/tmp/employee-monitor.class}
Discovery Class: {/tmp/employee-discover.class}
Do you want to specify properties for this Topology Type? Choose 'y' for yes and n' for no: {y}
Topo Type Attribute Specification:
--------------------------------
Name of Attribute: {Employee ID}
Description: {Employee Badge number}
Type: {Char}
Is this attribute needed to uniquely identify a topology object that is of type 'Employee'. Choose 'y' for yes and 'n' for no: {y}
Should this attribute be specified by the user for creating/discovering a topology object that is of type 'Employee'. Choose 'y' for yes and 'n' for no: {y}
Do you want to specify properties for this Topology Type? Choose 'y' for yes and 'n' for no: {y}
Topo Type Attribute Specification:
--------------------------------
Name of Attribute: {Room number of Employee}
Description: {Room number where the employee sits}
Type: {Char}
Is this attribute needed to uniquely identify a topology object that is of type 'Employee'. Choose 'y' for yes and 'n' for no: {n}
Should this attribute be specified by the user for creating/discovering a topology object that is of type 'Employee'. Choose 'y' for yes and 'n' for no: {n}
Do you want to specify properties for this Topology Type? Choose 'y' for yes and 'n' for no: {n}
Do you want to specify any menu actions for this Topology Type? Choose 'y' for yes and 'n' for no: {n}
Please enter 'y' to save this new topology type or 'n' to cancel the new topology type specified: {y}
New topology type 'Employee' successfully created . . .
Choose from the following options:
1 to list existing topology types or n to enter new topology type or q to quit: {1}
The existing topology type(s) are:
1. SNMP Agent
2. Employee
Choose from the following options:
'r' to return to the main menu or 'd' to get details about the topology type or 'q' to quit: {d}
The existing topology type(s) are:
1. SNMP Agent
2. Employee
Please choose a topology type from above: {2}
The following are the details:
Topology Type Name: Employee
Topology Description: Employee type
Is this topology type a container?: False
Icon: /tmp/employee-icon.gif
Parent Type Name: base topology
Monitor Class: /tmp/employee-monitor.class
Discovery Class: /tmp/employee-discover.class
Topo Type Properties:
----------------------------------
Name of Attribute: Employee ID
Description: Employee Badge number
Type: Char
isKey: True
User Specified: True
Name of Attribute: Room number of Employee
Description: Room number where the employee sits
Type: Char
isKey: False -continued User Specified: False
Choose from the following options:
'r' to return to the main menu or 'd' to get details about a topology type or
    'q' to quit: {q}
. . . Exiting . . .

---

The following is an example of a script based interface for device type modeling, in accordance with one embodiment of the invention. The following example is not intended to limit the scope of the application. Note that the user response is delimited by "{ }."

Example of Script based Interface for Device Type Modeling

---

Choose from the following options:
1 to list existing device types or n to enter new device type or q to quit: {n}
Enter the following information:
Device Type Name: {Ultra60}
Device Description: {This is Ultra60 platform}
The following Topology Type(s) are available:
1. SNMPAgent
2. User
3. Server
4. Disk
5. ICMP Ping Host
Please choose a Topology Type you wish to associate this icon with from the list above and enter the number now: {5}
Icon: {/tmp/p-Ultra60-icon.gif}
Do you associate this device with other Topology Types? Answer 'y' for yes and 'n' for no: {y}
The following Topology Types are available:
1. SNMPAgent
2. User
3. Server
4. Disk
5. ICMP Ping Host
Please choose a Topology Type you wish to associate this icon with from the list above and enter the number now: {1}
Icon: {/tmp/ca-Ultra60-icon.gif}
Do you associate this device with other Topology Types? Answer 'y' for yes and 'n' for no: {n}
Please enter 'y' to save this new device type or 'n' to cancel the new device type specified: {y}
New device type 'Ultra60' successfully created . . .
Choose from the following options:
1 to list existing device types or n to enter new device type or
q to quit: {1}
The existing device type(s) are:
1. Serengeti
2. Ultra60
Choose from the following options:
'r' to return to the main menu or 'd' to get details about a device type or
'q' to quit: {d}
The existing device type(s) are:
1. Serengeti
2. Ultra60
Please choose a device type from above: {2}
The following are the details:
Device Type Name: Ultra60
Device Description: This is Ultra60 platform
Topology Type: ICMP Ping Host
Icon: {/tmp/p-Ultra60-icon.gif}
Topology Type: SNMP Agent Host
Icon: {/tmp/ca-Ultra60-icon.gif}
Choose from the following options:
'r' to return to the main menu or 'd' to get details about a device type or
'q' to quit: {q}
. . . Exiting . . .

---

In one embodiment of the invention, the topology service (or another service within the resource management system)

includes functionality to perform/enable one or more of the following operations: 1) functionality to create topology objects using the discovery method defined in the topology type object to discover a particular type of managed object; 2) functionality to monitor a topology object using the monitor method defined in the topology type associated with the topology object; 3) functionality to maintain ownership of a topology tree and functionality to locally maintain all topology trees that are owned by the particular topology service; 4) functionality to remotely represent and access a topology object (described below).

In one embodiment of the invention, the topology service includes functionality to enable a remote user to reference topology root objects on remote topology services and to perform topology operations (e.g., create, delete, modify) on any topology object connected directly or indirectly to the referenced topology root object. In one embodiment of the invention, the user creates a topology object, which references the remote topology root object in the remote topology service. Via the reference to the remote topology root object, the user is subsequently able view and manipulate (create/delete/update) the remote topology objects (i.e., branch topology objects and leaf topology objects) that are connected (directly or indirectly) with the remote topology root objects, as if the topology objects are present on the local topology service. In one embodiment of the invention, when the topology service attempts to manipulate the remote topology object, the topology service forwards the request to manipulate the remote topology object to the topology service that owns the remote topology object. The topology object that owns the remote topology object subsequently performs the request and forwards the response back to the topology service, which subsequently updates the remote topology object.

Note, however, that when the user has completed viewing and manipulating the remote topology objects, the user may remove the reference to remote topology root object by deleting the remote topology root object. This action only deletes remote topology root objects in the local topology service, and does not alter topology root objects in the remote topology service.

Figure 4:
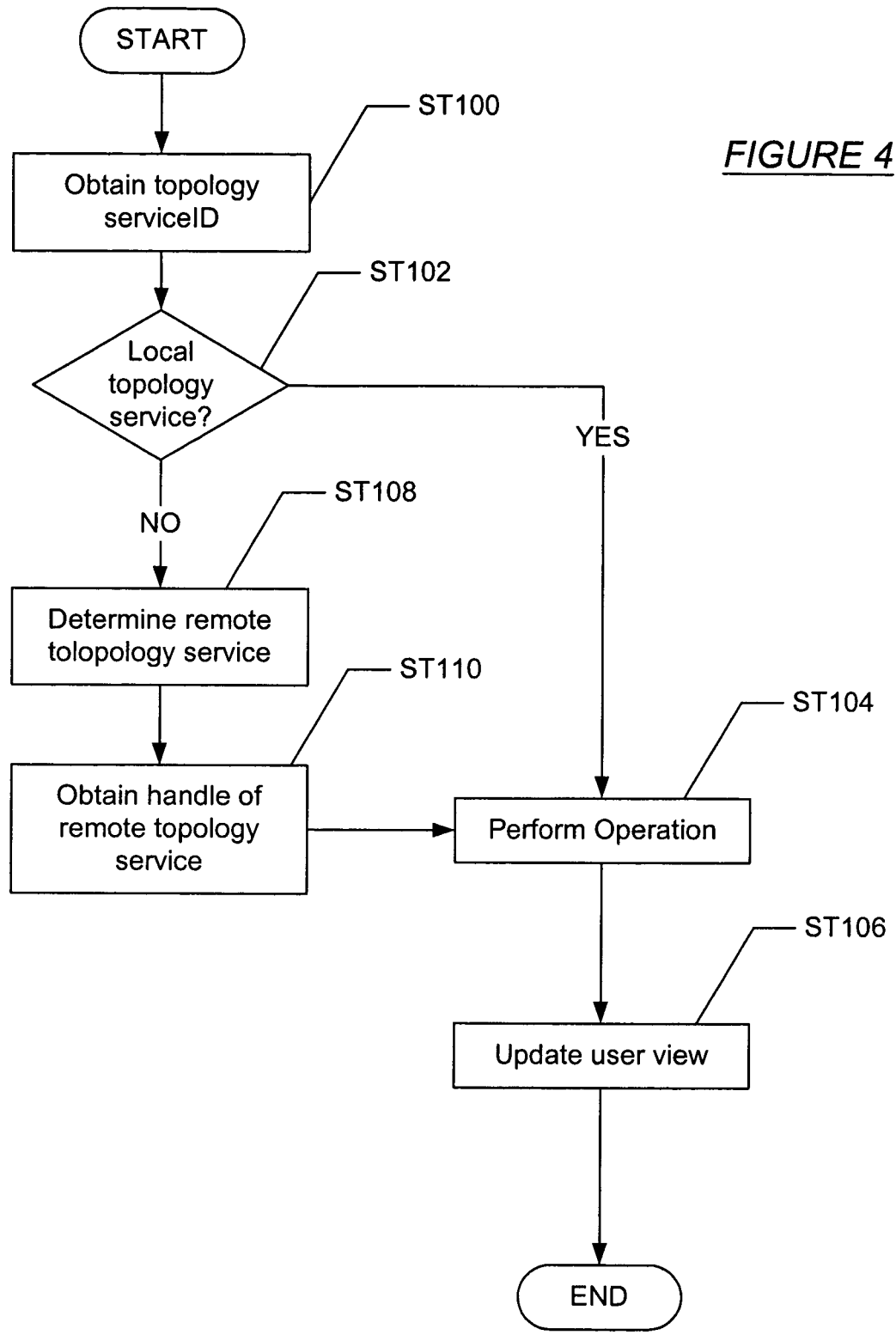
FIG. 4 shows a flowchart in accordance with one embodiment of the invention.

In one embodiment of the invention, the remote topology objects referenced by the local topology service are not stored in a local database; only the reference remote topology root object is stored. When a user in the local topology service views and/or manipulates a remote topology, the necessary information is obtained from the remote topology. Further, manipulation of the remote topology objects, made via the local topology service, are updated on the remote topology service. FIG. 4 shows a flowchart for manipulating a remote topology object in accordance with one embodiment of the invention.

Initially, a ServiceID associated with the topology object on which an operation is to be performed is obtained (Step 100). As noted above, the ServiceID uniquely identifies the topology service upon which in topology object is located. The ServiceID is usually associated with a topology object via a TopoID object. Based on the value of the ServiceID, the topology service can determine whether the topology object is local to the topology service (i.e., the ServiceID of the topology object is the same as the ServiceID of the topology service that is making the determination) or is remote to the topology service (i.e., the topology object currently being accessed by the topology service resides on a remote topology service) (Step 102).

If the topology object is local to the topology service, then the operation specified by the user is performed (Step 104) and the user view, via the user interface, is updated accordingly (Step 106). Alternatively, if the topology object is not local to topology service, then the topology service determines the remote topology service on which the topology object resides (Step 108). Once the remote topology service is found, a handle on the remote topology service is obtained (Step 110). The operation is subsequently performed (Step 104), on the remote topology object. The results are then forwarded from the remote topology service to the topology service and subsequently viewed by the user (Step 106). In one embodiment of the invention, operations such as create, modify, retrieve are handled using the aforementioned procedure.

Those skilled in the art will appreciate that the TopoID object is not generated for the reference to topology object, but rather is obtained from the remote topology to which the TopoID object belongs. Further, those skilled in the art will appreciate that additional functionality may be required in the service framework to provide adequate identification (i.e., ServiceIDs) for the various topology services. In addition, enhanced or new security guidelines may be implemented to enable the topology services to efficiently provide and obtain ServiceIDs while maintaining an adequate level of security.

In one embodiment of the invention, the topology service includes functionality to generate events when a topology object is created, deleted, or updated. In some embodiments of the invention, the clients of the topology service are able to register for specific (or all) events on specific (or all) topology objects. For example, a client may be interested in creating and deleting events of first level children associated with a given topology object (specified as a container), in the topology.

Accordingly, the client registers for only create and delete events on its first level children topology objects. A topology event filtering mechanism, running on the topology service, allows the client to specify this requirement when registering for events. In addition, generated events are filtered based on the event type and ObjectID, such that only the clients who registered for the particular events are notified.

The generated events in the topology service may be defined using a TopoEvent class. The event object, defined by the TopoEvent class, may include information about type of event and TopoID of the topology object, which triggered the generated of the event. A client may, upon receiving the event, obtain additional details about the event from the topology service.

In one embodiment of the invention, the topology service includes functionality to allow a client to register a local listener (i.e., a process enabled to "listen" for an event) with a remote topology. In other cases, the local listener may not be directly registered to the remote topology service because the remote topology service may not be able to send the event directly to the client via a registered local listener. This situation may occur, for example, when a firewall is interposed between the client and remote topology service. In this cases, the following embodiment may be used because a path always exists from the remote topology to the local topology. This path is always present because the local topology would not be able to create the referenced remote topology object otherwise.

In one embodiment of the invention, the aforementioned functionality may be implemented in the following manner. Initially, a local topology service determines whether a client, via a local listener, is interested in an event on a remote topology object by examining the ObjectID. The local topology then creates a remote listener for that event and registers it with the remote topology. The local topology maintains a mapping between the remote listener that it created and the local listener associated with the client, for example, in a hash table. When an event occurs on the remote topology object, the local listener is notified by the remote listener. The local listener, in turn, notifies the client.

Figure 5:
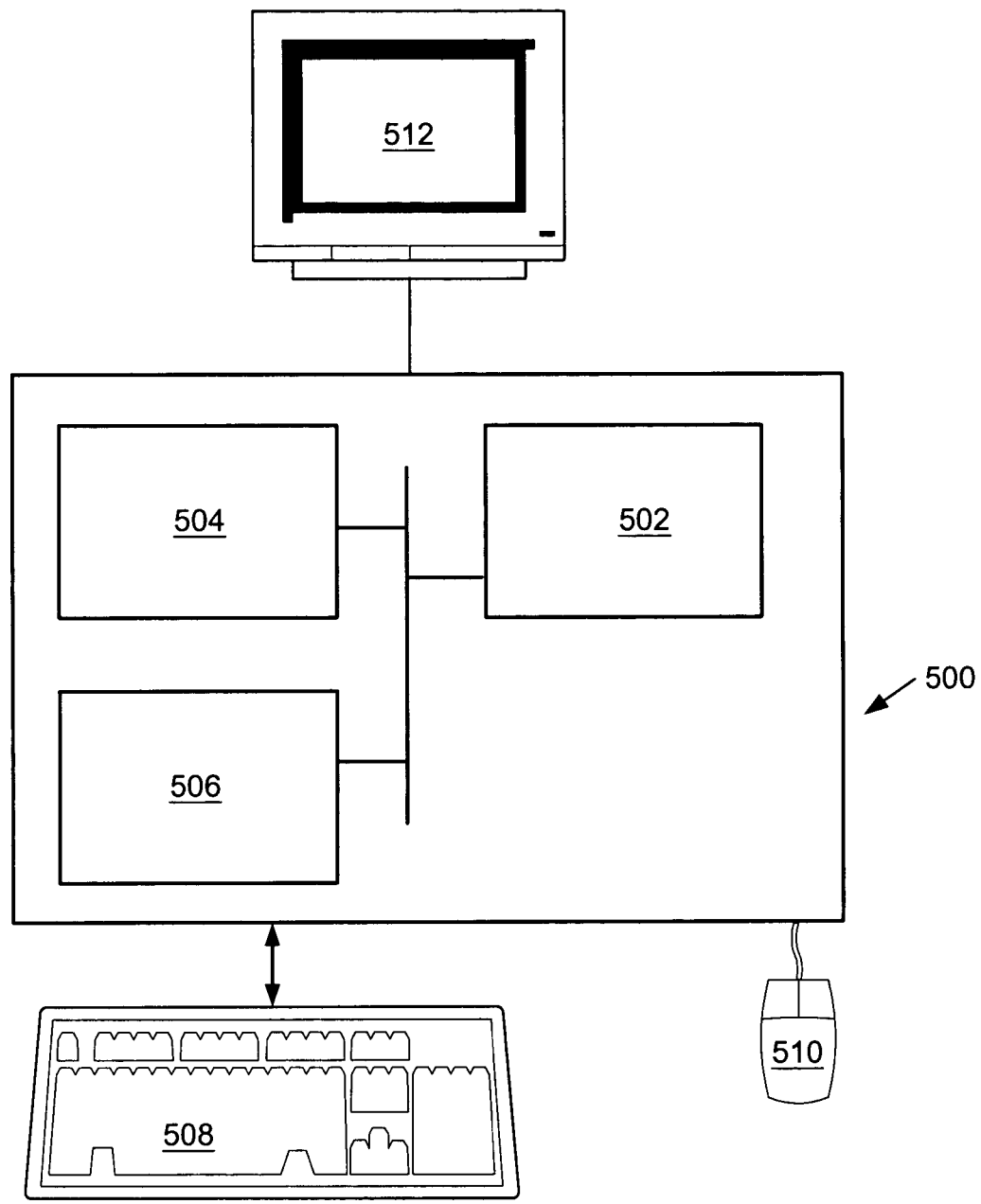
FIG. 5 shows a networked computer system in accordance with one embodiment of the invention.

The invention may be implemented on virtually any type of computer regardless of the platform being used. For example, as shown in FIG. 5, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (500) may be located at a remote location and connected to the other elements over a network.

Embodiments of the invention provide a topology modeling framework to consistently model physical and logical resources. Embodiments of the invention also provide a means to change the managed resource (e.g., change the type, add additional devices, types, etc.) without requiring the topology service to be modified. Further, embodiments of the invention provide a topology modeling framework that is re-usable across diverse resource management systems. Further, embodiments of the invention provide functionality to allow more than one topology service to manage a given topology.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for modeling a device in a topology, comprising:
   receiving, from a first user, a definition of a topology type for a device type using a script based interface;
   obtaining a managed object corresponding to the device, wherein the device is of the device type;
   defining a managed resource using the managed object; and
   creating a node for the managed resource in the topology using the definition of the topology type,
   wherein the definition of the topology type comprises:
      an attribute component including at least one attribute of the device, wherein the at least one attribute comprises:
         a value component storing a value of the at least one attribute;
         an is Key component indicating whether the at least one attribute corresponds to a key that may uniquely identify the managed resource in the topology; and
         a user specified component indicating whether the at least one attribute must be specified by a second user when the node is at least one selected from a group consisting of created and discovered; and
      an action component defining at least one action that is performed on the node having the topology type.

2. The method of claim 1, wherein the managed object comprises a plurality of properties of the device.

3. The method of claim 2, wherein defining the managed resource using the managed object comprises:
   including a minimum number of the plurality of properties required to represent the managed object in the topology, wherein the minimum number is identified in the definition of the topology type.

4. The method of claim 1, wherein creating the node further comprises:
   obtaining a topology ID uniquely identifying the node in the topology.

5. The method of claim 4, wherein obtaining the topology ID comprises:
   specifying a service ID, wherein the service ID identifies a topology service with which the topology is associated; and
   specifying an object ID, wherein the object ID uniquely identifies the node in the topology.

6. The method of claim 4, wherein creating the node further comprises:
   obtaining an access control list component defining access permissions for the node;
   defining a severity component, wherein the severity component represents an alarm severity of the node; and
   obtaining a parentNode ID, wherein the parentNodeID corresponds to another topology ID of a parent node of the node.

7. The method of claim 6, wherein the access control list component comprises at least one selected from the group consisting of a method level access control list and an object level access control list.

8. The method of claim 7, wherein the method level access control list defines a group of users that may request creating the node.

9. The method of claim 1, wherein the definition of the topology type further comprises:
   a monitor class component defining a path to a class that monitors the node; and
   a discovery class component defining a path to a class that discovers the device.

10. The method of claim 1, wherein the device type comprises:
    a topology type name component specifying a topology type to associate the device type with; and
    an icon used to graphically represent the device defined by the device type in a presentation tier.

11. The method of claim 1, wherein the node is associated with a TopoInfo object, wherein the TopoInfo object comprises a minimum information required to represent the node in the topology.

12. The method of claim 11, wherein the TopoInfo object is used by a presentation tier to display the topology.

13. The method of claim 1, wherein the device is one selected from the group consisting of a logical device and a physical device.

14. The method of claim 1, wherein a topology service may perform an action on the node.

15. The method of claim 1, wherein a remote topology service may access the node.

16. The method of claim 15, wherein the remote topology service locally represents the node using a reference to the node.

17. The method of claim 1, wherein a serviceID is used to determine whether a topology service is one selected from a group consisting of a remote topology service and a local topology service.

18. The method of claim 1, wherein the first user creates the definition of the topology type.

19. A topology modeling framework, comprising:
a definition of a topology type for a device type, wherein the definition of the topology type is received from a first user using a script based interface;
a managed object corresponding to a device, wherein the device is of the device type;
a managed resource, wherein the managed resource is defined using the managed object; and
a topology comprising a node, wherein the node is created for the managed resource using the definition of the topology type,
wherein the definition of the topology type comprises:
an attribute component including at least one attribute of the device, wherein the at least one attribute comprises:
a value component storing a value of the at least one attribute;
an is Key component indicating whether the at least one attribute corresponds to a key that may uniquely identify the managed resource in the topology; and
a user specified component indicating whether the at least one attribute must be specified by a second user when the node is at least one selected from a group consisting of created and discovered; and
an action component defining at least one action that is performed on the node having the topology type.

20. The topology modeling framework of claim 19, wherein the managed object comprises a plurality of properties of the device.

21. The topology modeling framework of claim 20, wherein the managed resource comprises a minimum number of the plurality of properties required to represent the managed object in the topology, and wherein the minimum number is identified in the definition of the topology type.

22. The topology modeling framework of claim 19, wherein the node comprises:
a topology ID uniquely identifying the node in the topology.

23. The topology modeling framework of claim 22, wherein the topology ID comprises:
a service ID, identifying a topology service with which the topology is associated; and
an object ID uniquely identifying the node in the topology.

24. The topology modeling framework of claim 23, wherein the further comprises:
an access control list component defining access permissions for the node;
a severity component defining an alarm severity of the node; and
a parentNode ID, wherein the parentNodeID corresponds to another topology ID of a parent node of the node.

25. The topology modeling framework of claim 24, wherein the access control list component comprises at least one selected from the group consisting of a method level access control list and an object level access control list.

26. The topology modeling framework of claim 24, wherein the method access control list defines a group of users that may request creating the node.

27. The topology modeling framework of claim 19, wherein the definition of the topology type further comprises:
a monitor class component defining a path to a class that monitors the node; and
a discovery class component defining a path to a class that discovers the device.

28. The topology modeling framework of claim 19, wherein the device type comprises:
a topology type name component specifying a topology type to associate the device type with; and
an icon used to graphically represent the device defined by the device type in a presentation tier.

29. The topology modeling framework of claim 19, further comprising
a TopoInfo object, wherein the TopoInfo object comprises a minimum information required to represent the node in the topology.

30. The topology modeling framework of claim 29, wherein the TopoInfo object is used by a presentation tier to display the topology.

31. The topology modeling framework of claim 19, wherein the device is one selected from the group consisting of a logical device and a physical device.

32. The topology modeling framework of claim 19, wherein the first user creates the definition of the topology type.

33. An enterprise system for modeling a topology having a node, comprising:
a device tier comprising a device;
a presentation tier comprising a client console; and
a service tier interfacing the device tier and the presentation tier using a resource management system,
wherein the resource management system comprises a topology service using a topology modeling framework comprising:
a definition of a topology type for a device type, wherein the definition of the topology type is received from a first user using a script based interface;
a managed object corresponding to the device, wherein the device is of the device type;
a managed resource, wherein the managed resource is defined using the managed object; and
the topology, wherein the node is created for the managed resource using the definition of the topology type;
wherein the definition of the topology type comprises:
an attribute component including at least one attribute of the device, wherein the at least one attribute comprises:
a value component storing a value of the at least one attribute;
an is Key component indicating whether the at least one attribute corresponds to a key that may uniquely identify the managed resource in the topology; and
a user specified component indicating whether the at least one attribute must be specified by a second user when the node is at least one selected from a group consisting of created and discovered; and
an action component defining at least one action that is performed on the node having the topology type.

34. The system of claim 33, wherein the managed object comprises a plurality of properties of the device.

35. The system of claim 34, wherein the managed resource comprises a minimum number of the plurality of properties required to represent the managed object in the topology, and wherein the minimum number is identified in the definition of the topology type.

36. The system of claim 33, wherein the node comprises:
a topology ID uniquely identifying the node in the topology.

37. The system of claim 36, wherein the topology ID comprises:
a service ID, identifying a topology service with which the topology is associated; and
an object ID uniquely identifying the node in the topology.

38. The system of claim 37, wherein the node further comprises:
an access control list component defining access permissions for the node;
a severity component defining an alarm severity of the node; and
a parentNode ID, wherein the parentNodeID corresponds to another topology ID of a parent node of the node.

39. The system of claim 38, wherein the access control list component comprises at least one selected from the group consisting of a method level access control list and an object level access control list.

40. The system of claim 39, wherein the method access control list defines a group of users that may request creating the node.

41. The system of claim 39, wherein the topology type further comprises:
a monitor class component defining a path to a class that monitors the node; and
a discovery class component defining a path to a class that discovers the device.

42. The system of claim 33, wherein the device type comprises:
a topology type name component specifying a topology type to associate the device type with; and
an icon used to graphically represent the device defined by the device type in the presentation tier.

43. The system of claim 33, further comprising
a TopoInfo object, wherein the TopoInfo object comprises a minimum information required to represent the node in the topology.

44. The system of claim 43, wherein the TopoInfo object is used by a presentation tier to display the topology.

45. The system of claim 33, wherein the device is one selected from the group consisting of a logical device and a physical device.

46. The system of claim 33, wherein the first user creates the definition of the topology type.

* * * * *